US005117626A

United States Patent [19]

North et al.

[11] Patent Number: 5,117,626

[45] Date of Patent: Jun. 2, 1992

[54] APPARATUS FOR COOLING ROTATING BLADES IN A GAS TURBINE

[75] Inventors: William E. North, Winter Springs; Frank A. Pisz, Titusville, both of Fla.

[73] Assignee: Westinghouse Electric Corp., Pittsburgh, Pa.

[21] Appl. No.: 577,376

[22] Filed: Sep. 4, 1990

[51] Int. Cl.[5] .................................... F02C 3/00

[52] U.S. Cl. .................................... 60/39.75; 416/96 R

[58] Field of Search .................... 60/39.75; 416/96 R, 416/97 R; 415/115, 116

[56] References Cited

U.S. PATENT DOCUMENTS 3,635,586 1/1972 Kent et al. .................... 416/96 R
4,456,428 6/1984 Cuvillier .................... 416/96 R
4,474,532 10/1984 Pazder .................... 415/115

*Primary Examiner*—Richard A. Bertsch
*Assistant Examiner*—Howard R. Richman

[57] ABSTRACT

An apparatus and method are provided for cooling the rotating blades in the turbine section of a gas turbine. Cooling of the leading edge is accomplished by forming a radial passageway in the leading edge portion of the blade airfoil. Rows of holes along the leading edge of the blade airfoil allow cooling air to flow from the radial passageway to the surface of the leading edge, thereby cooling the leading edge portion of the airfoil. The flow area of the radial passageway reduces as it extends radially outward so that the velocity of the cooling air flowing through the passageway is maintained. A plenum formed in the root portion of the blade distributes cooling air to small diameter holes in the center and trailing edge portion of the airfoil.

19 Claims, 4 Drawing Sheets

APPARATUS FOR COOLING ROTATING BLADES IN A GAS TURBINE

BACKGROUND OF THE INVENTION

1. Field of the Invention

The current invention relates to gas turbines. More specifically, the current invention relates to an apparatus and method for cooling the rotating blades of a gas turbine.

In the turbine section of a gas turbine, the rotor is comprised of a series of disks to which blades are affixed. Hot gas from the combustion section flows over the blades, thereby imparting rotating power to the rotor shaft. In order to provide maximum power output from the gas turbine, it is desirable to operate with gas temperatures as high as possible. However, operation at high gas temperatures requires cooling the blades. This is so because the strength of the material from which the blades are formed decreases as its temperature increases. Typically, blade cooling is accomplished by flowing air, bled from the compressor section, through the blades. Although this cooling air eventually enters the hot gas flowing through the turbine section, little useful work is obtained from the cooling air, since it was not subject to heat up in the combustion section. Thus, to achieve high efficiency, it is crucial that the use of cooling air be kept to a minimum. The current invention discloses an apparatus and method for cooling the blades using a minimum of cooling air.

DESCRIPTION OF THE PRIOR ART

In the past, the cooling of turbine blades by flowing cooling air through the blades was typically achieved using either of two blade cooling configurations. In the first configuration, a number of radial cooling holes are formed in the blade. These cooling holes span the length of the blade, beginning at the base of the blade root and terminating at the tip of the blade airfoil. Cooling air supplied to the base of the blade root flows through the holes, thus cooling the blade, and discharges into the hot gas flowing over the blade at its tip.

Performance of a cooling air scheme can be characterized by two parameters—efficiency and effectiveness. Cooling efficiency reflects the amount of cooling air required to absorb a given amount of heat. High cooling efficiency is achieved by maximizing the quantity of heat each pound of cooling air absorbs. By contrast, cooling effectiveness reflects the total amount of heat absorbed by the cooling air, without the regard to the quantity of the cooling air utilized.

The radial hole cooling configuration discussed above is very efficient because the small diameter of the radial holes, together with a high pressure drop across the holes, results in high cooling air velocity through the holes. This high velocity results in high heat transfer coefficients. Thus, each pound of cooling air absorbs a relatively large quantity of heat. Unfortunately, the cooling effectiveness of this configuration is low because the surface area of the radial holes is small. As a result, the radial hole configuration is incapable of providing the optimum cooling in the leading edge portion of the blade, where the gas temperatures and the heat transfer coefficients associated with the hot gas flowing over the blade are highest.

Typically, in the second configuration, one or more large serpentine circuits are formed in the blade. Cooling air, supplied to the base of the blade root, enters the circuits and flows radially outward until it reaches the blade tip, whereupon it reverses direction and flows radially inward until it reaches the base of the airfoil, whereupon it changes direction again and flows radially outward, eventually exiting the blade through holes in the trailing edge or tip portions of the airfoil. As a result of the large surface area of the circuit and the large amount of cooling air flowing through the blade, the cooling effectiveness of this configuration is high. Moreover, heat transfer in the leading edge portion of the airfoil is often enhanced by forming one or more radially extending rows of approximately axially oriented holes through the leading edge of the airfoil. These holes connect with one of the serpentine circuits, allowing a portion of the cooling air entering the circuit to exit the blade at its leading edge.

One arrangement of such leading edge holes used in the past, referred to as the "shower head" arrangement, involved arranging the holes into groups of three or more holes at each radial location. The middle hole directs the cooling air to the very center of the leading edge and the adjacent holes direct the cooling air to the convex and concave sides of the leading edge, respectively. It has been observed that the discharge of cooling air at the leading edge tends to disrupt the boundary layer in the hot gas flowing over the blade, resulting in an increase in the heat transfer coefficient associated with the hot gas flowing over the blade surface. To minimize this disturbance to the boundary layer, the holes in the leading edge are sometimes inclined with respect to the radial direction.

It should be noted, however, that in the serpentine circuit configuration, all of the cooling air enters and flows through the circuits, so that the flow area of the circuits is large, resulting in low velocity flow and low heat transfer coefficients. Although axially oriented ribs have sometimes been incorporated into the serpentine circuits to increase turbulence, and hence the heat transfer coefficient, the cooling efficiency of the serpentine circuit configuration remains relatively low. As a consequence, excessive quantities of cooling air must be utilized to the detriment of the overall gas turbine efficiency.

Thus, it would be desirable to devise a scheme which allowed the use of the efficient radial hole cooling configuration in most portions of the blade, but which provided a cooling effectiveness comparable to that of the serpentine circuit configuration in the critical leading edge portion of the blade without the large amount of cooling air usage associated with the serpentine configuration.

SUMMARY OF THE INVENTION

The object of the current invention is to provide a means for cooling the rotating blades in the turbine section of a gas turbine.

It is another object of the invention to provide adequate cooling in the leading edge portions of the blades without using excessive amounts of cooling air and to provide very efficient use of cooling air in the center and trailing edge portions of the blades.

These and other objects are accomplished in the turbine section of a gas turbine having a plurality of rotating blades affixed to the periphery of a disk. Cooling air is supplied to each blade root and divided into two portions. The first portion flows through a radial passageway in a leading edge portion of the blade airfoil, thereby cooling the leading edge portion. In addition, rows of holes, in flow communication with the radial passageway, are arranged along the leading edge providing further cooling. The spacing of the holes along the leading edge is varied to accommodate variations in the radial temperature distribution along the leading edge. The radial passageway is tapered as it extends in the outboard direction so that the velocity of the cooling air flowing in the passageway remains approximately constant as air is drawn off by the holes.

The second portion of cooling air supplied to the blade root flows into a plenum formed in the blade root. The plenum distributes the air to small radial holes extending through the center and trailing edge portions of the blade. The cooling air flows through the radial holes and exits at the tip of the blade.

DESCRIPTION OF THE PREFERRED EMBODIMENT

Figure 1:
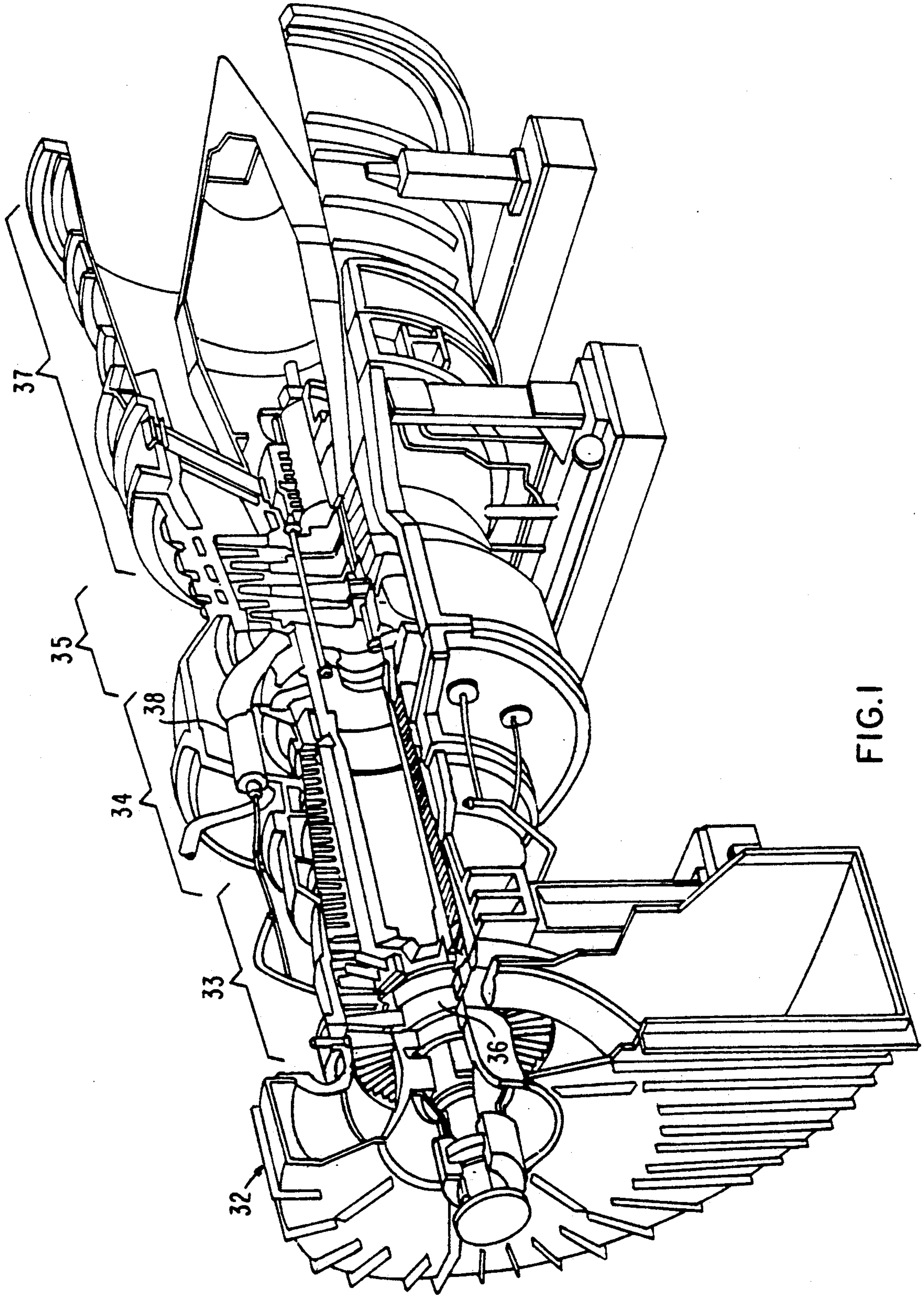
FIG. 1 is an isometric view, partially cut away, of a gas turbine.

There is shown in FIG. 1 a gas turbine. The major components of the gas turbine are the inlet section 32, through which air enters the gas turbine; a compressor section 33 in which the entering air is compressed; a combustion section 34, in which the compressed air from the compressor section is heated by burning fuel in combustors 38, thereby producing a hot compressed gas 24; a turbine section 35 in which the hot compressed air from the combustion section is expanded, thereby producing rotating shaft power; and an exhaust section 37, through which the expanded gas is expelled to atmosphere. A centrally disposed rotor 36 extends through the gas turbine.

Figure 2:
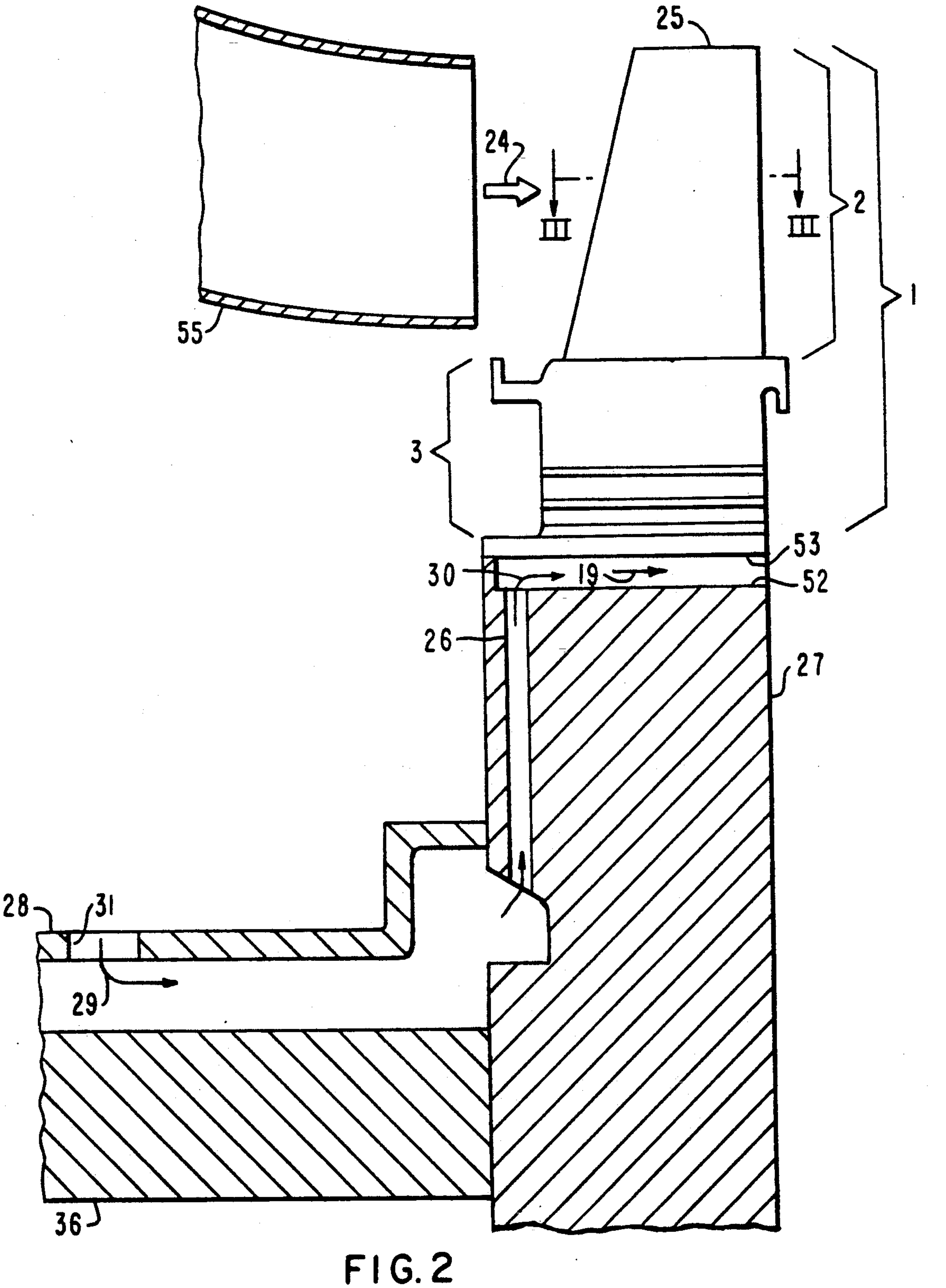
FIG. 2 shows a portion of the turbine section in the vicinity of the row 1 rotating blades.

The turbine section 35 of the gas turbine is comprised of alternating rows of stationary vanes and rotating blades. As shown in FIG. 2, each rotating blade 1 is affixed to a disk 27. The disk 27 forms a portion of the rotor 36 which extends through the turbine section 35. Each blade has an airfoil portion 2 and a root portion 3. The blades are retained in the disk by sliding each root portion 3 into mating groove 52 in the periphery of the disk 27.

As shown in FIG. 2, a duct 55 directs hot gas 24 from the combustion section 34, which may be at a temperature in excess of 1100° C. (2000° F.), over the airfoil portion 2 of each blade, resulting in the vigorous transfer of heat into the blade. Cooling air 29, drawn from the compressor section 33, enters the rotor 36 through holes 31 in an outer shell 28 of the rotor structure. Radial passageways 26 in the disk 27 direct the cooling air into the disk groove 52. The cooling air 30 flows along the groove 52 and enters the blade root 3 at its base 53.

Figure 3:
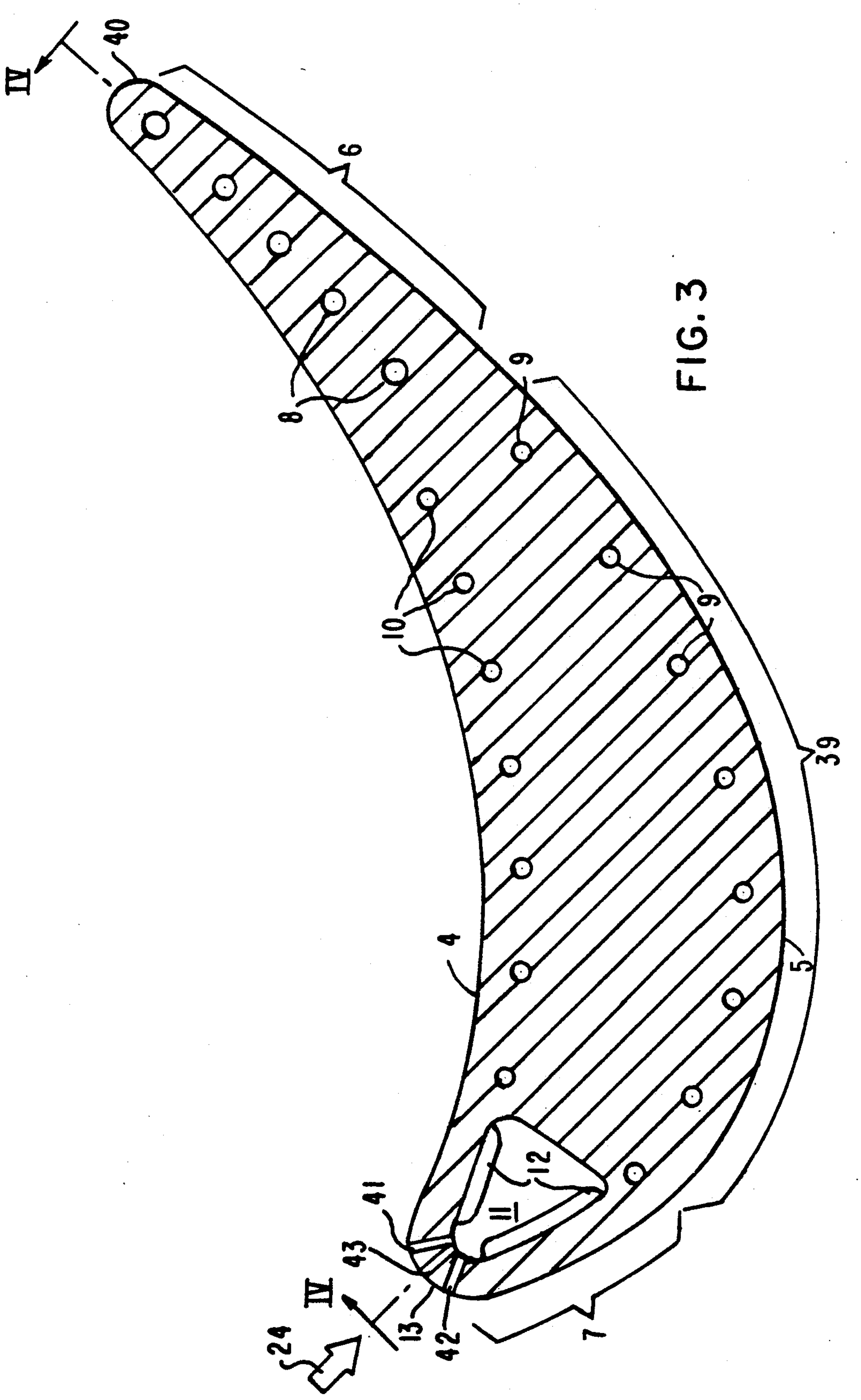
FIG. 3 is a cross-section of the airfoil portion of the blade taken through line III—III of FIG. 2.

As shown in FIG. 3, the airfoil portion of the blade has a leading edge 13 and a trailing edge 40. In addition, the body of the airfoil portion can be seen as comprising a leading edge portion 7, which is approximately the upstream one fifth of the airfoil portion, a center portion 39 and a trailing edge portion 6, which is approximately the downstream one third of the airfoil portion.

Figure 4:
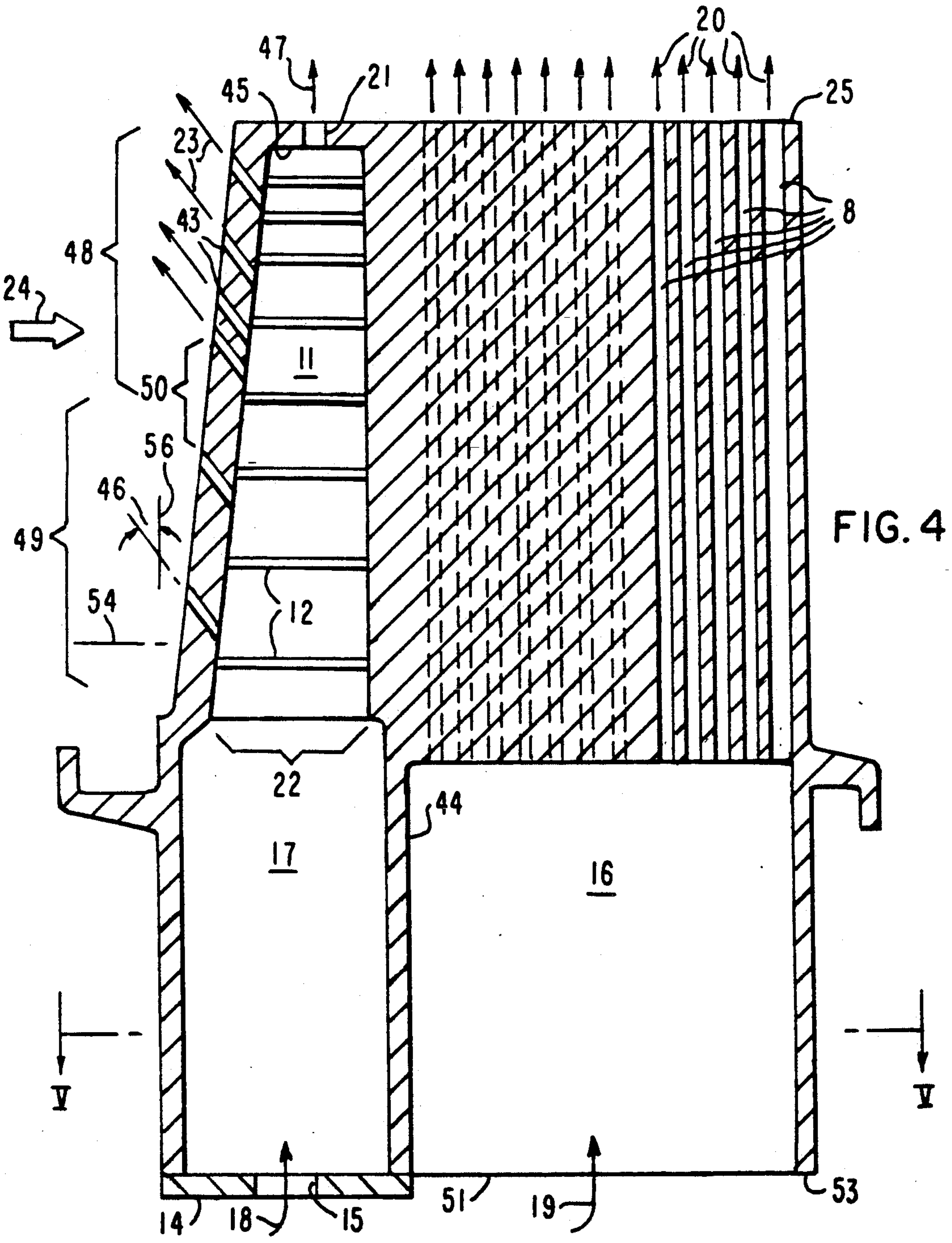
FIG. 4 is cross-section of the airfoil portion of the blade taken through line IV—IV of FIG. 3.
Figure 5:
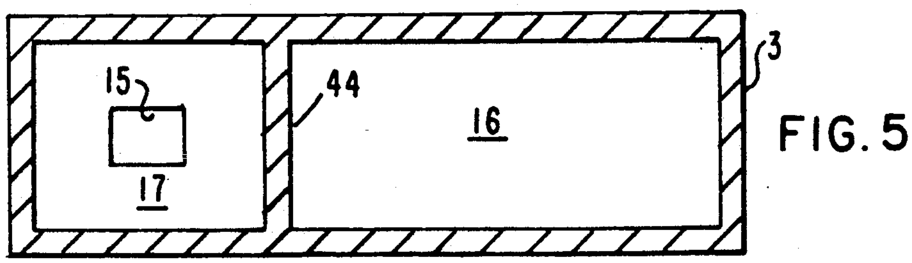
FIG. 5 is a cross section of the root portion of the blade, taken through line V—V of FIG. 4.

As shown in FIGS. 4 and 5, the blade root is essentially hollow. A radial rib 44 divides the interior portion of the root into a radial passageway 17 and a plenum 16. At the base 53 of the blade root, the cooling air 30 is divided by rib 44 into two portions 18, 19. Portion 18 enters the passageway 17 through a hole 15 in an orifice plate 14 affixed to the base 53 of the blade root. From hole 15 the cooling air 18 flows radially outward through passageway 17 in the blade root. Passageway 17 directs the cooling air to a radial passageway 11 in the airfoil.

A number of holes 43 are arranged in a radially extending row along the leading edge 13 of the airfoil. The holes 43 connect the radial passageway 17 to the hot compressed gas 24 flowing through the turbine section and thereby allow a portion 23 of the cooling air 18 to flow through and cool the leading edge of the airfoil. As previously discussed, the holes 43 are inclined at an acute angle 46 to the radial direction 56 to minimize the harmful disturbance caused by the introduction of the cooling air 23 into the boundary layer of hot gas flowing over the airfoil. It should also be noted that by inclining the holes, their length, and hence their surface area, is increased, thereby increasing heat transfer to the cooling air 23. In the preferred embodiment, the angle 46 is approximately 30°.

As previously discussed, the holes in the leading edge of the blade are preferentially arranged in the "shower head" arrangement shown in FIG. 3. In this arrangement, there are three radially extending rows of holes—a center row formed by holes 43, a concave side row formed by holes 41 and a convex side row formed by holes 42. The holes in each row are aligned in the radial direction so that there are three holes 41, 42, 43, one from each of the radially extending rows, at each radial position 54 along the leading edge 13. Hole 43 is oriented toward the very center of the leading edge, whereas holes 41 and 42 are inclined toward the concave 4 and convex 5 sides of the airfoil, respectively. Of course, more than three holes could be used at each radial position in a similar arrangement.

Typically, the heat transfer from the hot gas 24 into the airfoil is greater in the outboard portion 48 of the airfoil than in the inboard portion 49. This occurs because the temperature profile of the hot gas from the combustion section is often skewed so that the temperature of the gas is higher in the outboard portion. Also, the greater relative speed between the airfoil and the hot gas at the outboard portion results in higher heat transfer coefficients. Hence, in the preferred embodiment, although the radially extending rows of cooling holes 41, 42, 43 extend through both the inboard 49 and outboard 48 portions, the radial spacing 50 of the cooling holes 41, 42, 43 is less in the outboard portion 48 than in the inboard portion 49, so that the radial distribution of cooling air matches that of the temperature distribution along the leading edge.

The portion of the cooling air which does not exit the blade through holes 41, 42, 43 flows through radial passageway 11 providing additional cooling to the leading edge portion 7 of the airfoil. A number of axially oriented ribs 12 are disposed along the passageway to increase the heat transfer coefficient at the surface of the passageway The radial passageway 11 terminates at the tip 25 of the airfoil, the tip 25 being the most radially outboard portion of the airfoil. A hole 21 in the outboard end 45 of the passageway allows a portion 47 of the cooling air to flow out of the blade tip 25 to insure that dust particles entrained in the cooling air do not pile up in the passageway and eventually block the holes 41, 42, 43.

As can be seen in FIG. 4, the cross sectional flow area 22 of radial passageway 11 continuously decreases as it extends in the radially outward direction. This insures that the velocity of the cooling air is maintained as the quantity of cooling air is reduced due to the flow through holes 41, 42, 43. In the preferred embodiment, the flow area of passageway 11 at any cross-section along the leading edge 13 is inversely proportional to the number of holes 41, 42, 43 inboard of the cross-section—that is, the reduction in the cross-sectional area 22 depends on the number of holes 41, 42, 43 passed as the passageway extends radially outward, so that the rate of reduction in cross-sectional area is greatest in the outboard portion 48 of the airfoil where the radial spacing of holes 41, 42, 43 is the smallest. Thus, the velocity of the cooling air, and hence a high heat transfer coefficient, is maintained as the cooling air flows through passageway 11. For example, in the preferred embodiment, in a blade having an airfoil width—that is, the distance from the leading edge to the trailing edge—of approximately 9 cm (3.5 in), the cross-sectional flow area 22 at the entrance to passageway 11 is approximately 1.03 $cm^2$ (0.16 $in^2$), whereas the cross-sectional flow area at outboard end 45 of the passageway is approximately 0.26 $cm^2$ (0.04 $in^2$). Of course, other size passageways could also be utilized depending on the size and desired cooling characteristics of the blade.

An orifice plate 14 is affixed to the portion of the base 53 of the blade root in the vicinity of the radial passageway 17. By adjusting the size of the hole 15 in the orifice plate, the quantity of cooling air supplied to the radial passageway can be adjusted.

It can be appreciated that, according to the invention, highly effective cooling of the leading edge portion of the airfoil is achieved as a result of the combined effect of (1) the relatively large surface area of the radial passageway 11, (2) the large quantity of holes 41, 42, 43 connecting the passageway to the surface of the leading edge (inclined at an angle to increase surface area and minimize disturbance of the boundary layer, and spaced to provide cooling where it is most needed), (3) the high velocity of the cooling air throughout the passageway as a result of its tapered shape and (4) the turbulence enhancing ribs.

As shown in FIGS. 3 and 4, according to the invention, the center portion 39 and the trailing edge portion 6 of the airfoil are cooled by the second portion 19 of the cooling air supplied to the base of the blade root. Groove 52 in disk 27 directs cooling air 19 along the base 53 of the blade root 3 to opening 51. From opening 51 cooling air 19 enters plenum 16 formed in the blade root. Radial holes 8, 9, 10 extend from the plenum 16 to the tip 25 of the airfoil. Although the invention could be practiced by dispensing with the plenum and extending the radial holes from the base of the blade root to the tip of the airfoil, or by reducing the size of the plenum so that it connected with only the radial holes 9, 10 in the center portion, in the preferred embodiment the plenum serves to distribute the cooling air evenly among the radial holes 8, 9, 10 in both the center and trailing edge portions of the airfoil. Cooling air 19 flows through the radial holes 8, 9, 10, after which the cooling air 20 discharges at the tip 25 into the hot gas 24 flowing over the airfoil. As previously discussed, the diameter of the radial holes 8, 9, 10 is relatively small so that the velocity of the cooling air through holes is high. This results in high heat transfer coefficients and efficient use of cooling air.

As shown in FIG. 3, a single row of radial holes 8 is formed in the trailing edge portion 6 of the airfoil. The row extends parallel to the surfaces 4, 5 of the airfoil. In the center portion 39, where the airfoil is thicker, two rows of holes 9, 10 are formed. Holes 10 are disposed close to the convex surface 4 of the airfoil and holes 9 are disposed close to the concave surface 5. As in the trailing edge portion, the rows of holes 9, 10 in the center portion extend parallel to the airfoil surfaces. As shown in FIG. 3, the diameter of the holes 8 in the trailing edge portion are larger than the diameter of holes 9, 10 in the center portion, since only a single row of holes is utilized in the trailing edge portion. Moreover, according to the invention, the diameter of cooling air holes and their density could be varied throughout the center and trailing edge portions of the airfoil in response to variations in the temperature of the hot gas or heat transfer coefficients over the surfaces of the airfoil. For example, in the preferred embodiment, in a blade having an airfoil width of approximately 9 cm (3.5 in), the diameter of holes 8, 9, 10 is approximately in the 0.12–0.20 cm (0.05–0.08 in) range, thereby ensuring high velocity cooling air flow through the holes. By contrast, the cross-sectional area of passageway 11 is approximately 30–80 times greater than that of holes 8, 9, 10. Of course, holes of other size diameters could also be utilized depending on the size and desired coding characteristics of the blade.

According to the invention, a serpentine cooling circuit supplying large quantities of cooling air to the entire airfoil, as taught by prior art, is not employed. Instead, adequate cooling is achieved throughout the airfoil using a minimum quantity of cooling air by supplying a large flow of cooling air to only the leading edge portion of the airfoil, where such flow is required, and by making efficient use of such flow by maximizing the surface area and heat transfer coefficient associated with the cooling air in the leading edge portion. In the center and trailing edge portions, the use of cooling air is minimized by utilizing a large quantity of small radial holes, thereby achieving high heat transfer coefficients and efficient use of cooling air.

Although the above description has been directed to a preferred embodiment of the invention, it is understood that other modifications and variations known to those skilled in the art may be made without departing from the spirit and scope of the invention as set forth in the appended claims.

What is claimed is:

1. A gas turbine comprising:

a) a combustion section having means for producing a hot compressed gas;

b) a turbine section through which said hot compressed gas from said combustion section flows; and c) a plurality of rotating blades disposed within said turbine section, each of said blades having a root portion and an airfoil portion, each of said airfoil portions having a leading edge portion, a plurality of first holes formed in each of said airfoil portions, each of said first holes being radially oriented, a first radial passageway and a plurality of second holes formed in each of said leading edge portions, said second holes being radially distributed along said leading edge portion and connecting a respective one of said first radial passageways to the outside of a respective leading edge portion where hot compressed gas flows through said turbine section, wherein the cross-sectional area of each of said first radial passageways as said passageways extend in the radially outward direction reduces so that said cross-sectional area is inversely proportional to the quantity of said second holes having connected with said first radial passageway inboard of said cross-section.

2. The gas turbine according to claim 1 wherein said second holes are arranged in three radially extending rows along said leading edge, said second holes in each of said rows being radially aligned with said second holes in each of the other said rows so that there are three of said second holes at each radial position along said leading edge.

3. The gas turbine according to claim 2 wherein each of said second holes is inclined at an acute angle to the radial direction.

4. The gas turbine according to claim 1 further comprising a second radial passageway formed in each of said root portions, each of said first radial passageways and each of said second radial passageways having first and second ends, said first end of each of said second radial passageways connecting to said first end of each of said first radial passageways.

5. The gas turbine according to claim 4 further comprising a plenum formed in each of said root portions, each of said first holes connecting said plenums with said hot compressed gas flowing through said turbine section.

6. The gas turbine according to claim 4 further comprising an orifice formed at said second end of each of said second radial passageways.

7. The gas turbine according to claim 6 wherein each of said airfoil portions has a tip portion, said tip portion being the radially outboard portion of said airfoil portion, said second end of said first radial passageway being disposed in said tip portion, a third radial hole connecting said second end of said first radial passageway to said hot compressed gas flowing through said turbine section.

8. The gas turbine according to claim 7 further comprising a plurality of axially oriented ribs formed in each of said first radial passageways.

9. A gas turbine comprising:

a) a combustion section having means for producing a hot compressed gas;

b) a turbine section through which said hot compressed gas from said combustion section flows; and c) a plurality of rotating blades disposed within said turbine section, each of said blades having a root portion and an airfoil portion, each of said airfoil portions having a leading edge portion, a plurality of first holes formed in each of said airfoil portions, each of said first holes being radially oriented, a first radial passageway and a plurality of second holes formed in each of said leading edge portions, each of said second holes connecting a respective one of said first radial passageways to the outside of a respective leading edge portion where hot compressed gas flows through said turbine section, wherein the cross-sectional area of each of said first radial passageways is approximately 30–80 times greater than the cross-sectional area of each of said first holes.

10. The gas turbine according to claim 9 wherein the diameter of each of said first holes is in the 0.12–0.20 cm (0.05–0.08 in) range.

11. In a gas turbine having a centrally disposed rotor, a supply of cooling air for cooling said rotor, at least one blade affixed to said rotor, said blade having a root portion and an airfoil portion, said airfoil portion having leading, center, trailing edge and tip portions, means for providing a hot gas flow over said tip and leading edge portions, and means for cooling said blade, said blade cooling means comprising:

a) means for directing cooling air from said supply to said root portion;

b) a radial passageway formed in said leading edge portion, and means for directing a first portion of said cooling air from said root portion to said radial passageway;

c) a plurality of first holes arranged in a first radially extending row along said leading edge portion, said first holes connecting with said radial passageway to place a first portion of said cooling air in flow communication with said hot gas flowing over said leading edge portion;

d) a plurality of second holes formed in said trailing edge portion, and a plurality of third holes formed in said center portion, each of said second and third pluralities of holes being radially oriented, each of said second and third pluralities of radial holes placing a second portion of said cooling air directed to said root portion in flow communication with said hot gas flowing over said tip portion;

e) said root portion being hollow thereby forming a cavity in said root portion, at least a first portion of said cavity forming a plenum within said root portion for distributing said second portion of said cooling air among said second and third radial holes.

12. The gas turbine according to claim 11 wherein said airfoil portion has a convex surface and a concave surface, said second and third holes are arranged in second and third rows, respectively, and said second and third rows extend parallel to said convex and concave surfaces.

13. In a gas turbine having (i) a centrally disposed rotor, (ii) a supply of cooling air for cooling said rotor, (iii) at least one blade affixed to said rotor, said blade having a root portion and an airfoil portion, said airfoil portion having leading, center, trailing edge and tip portions, said airfoil portion having convex and concave surfaces, (iv) means for providing a hot gas flow over said tip and leading edge portions, and (v) means for cooling said blade, said blade cooling means comprising:

a) means for directing cooling air from said supply to said root portion;

b) a radial passageway formed in said leading edge portion, and means for directing a first portion of said cooling air from said root portion to said radial passageway;

c) a plurality of first holes arranged in a first radially extending row along said leading edge portion, said first holes connecting with said radial passageway to place a first portion of said cooling air in flow communication with said hot gas flowing over said leading edge portion;

d) a plurality of second holes formed in said trailing edge portion, and a plurality of third holes formed in said center portion, each of said second and third pluralities of holes being radially oriented, said second and third holes arranged in second and third rows, respectively, extending parallel to said convex and concave surfaces, respectively, each of said second and third pluralities of radial holes placing a second portion of said cooling air directed to said root portion in flow communication with said hot gas flowing over said tip portion, and e) a plurality of fourth holes formed in said center portion, said fourth holes being radially oriented, said fourth holes arranged in a fourth row extending parallel to said convex and said concave surfaces, said fourth row being closer to said convex surface than said concave surface, said third row of said third holes being closer to said concave surface than said convex surface.

14. In a gas turbine having (i) a centrally disposed rotor, (ii) a supply of cooling air for cooling said rotor, (iii) at least one blade affixed to said rotor, said blade having a root portion and an airfoil portion, said airfoil portion having leading, center, trailing edge and tip portions, said airfoil portion has a radially inboard portion and a radially outboard portion, (iv) means for providing a hot gas flow over said tip and leading edge portions, and (v) means for cooling said blade, said blade cooling means comprising:

a) means for directing cooling air from said supply to said root portion;

b) a radial passageway formed in said leading edge portion, and means for directing a first portion of said cooling air from said root portion to said radial passageway;

c) a plurality of first holes arranged in a first radially extending row along said leading edge portion, said first holes connecting with said radial passageway to place a first portion of said cooling air in flow communication with said hot gas flowing over said leading edge portion said first radially extending row of first holes extending through both said inboard and outboard portions, the spacing between said first holes in said first radially extending row being greater in said inboard portion than in said outboard portion; and d) a plurality of second holes formed in said trailing edge portion, and a plurality of third holes formed in said center portion, each of said second and third pluralities of holes being radially oriented, each of said second and third pluralities of radial holes placing a second portion of said cooling air directed to said root portion in flow communication with said hot gas flowing over said tip portion.

15. The gas turbine according to claim 14 wherein the flow area of said radial passageway decreases as said radial passageway extends in the radially outward direction.

16. The gas turbine according to claim 11 further comprising a plurality of fifth and sixth holes arranged in fifth and sixth radially extending rows, respectively, along said leading edge portion, said fifth and sixth holes placing a second portion of said cooling air directed to said radial passageway in flow communication with said hot gas flowing over said leading edge portion.

17. The gas turbine according to claim 11 further comprising means for adjusting the quantity of said first portion of said cooling air directed to said radial passageway.

18. The gas turbine according to claim 11 further comprising means for dividing said cavity into said first portion and a second portion, said second portion of said cavity forming said means for directing said first portion of said cooling air from said root portion to said radial passageway.

19. The gas turbine according to claim 18 wherein said dividing means comprises a rib formed in said cavity.

* * * * *